United States Patent
Liu et al.

(10) Patent No.: US 10,514,191 B2
(45) Date of Patent: Dec. 24, 2019

(54) DE-ICING CONTROL IN A VAPOR COMPRESSION HEAT PUMP SYSTEM

(71) Applicant: Ford Global Technologies, LLC, Dearborn, MI (US)

(72) Inventors: Yu Liu, Novi, MI (US); Anthony David Tsakiris, Beverly Hills, MI (US); Brett Allen Dunn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 530 days.

(21) Appl. No.: 14/597,624

(22) Filed: Jan. 15, 2015

(65) Prior Publication Data
US 2016/0209099 A1    Jul. 21, 2016

(51) Int. Cl.
*F25D 21/06* (2006.01)
*F25B 13/00* (2006.01)
(Continued)

(52) U.S. Cl.
CPC ........... *F25B 47/022* (2013.01); *B60H 1/004* (2013.01); *B60H 1/00899* (2013.01);
(Continued)

(58) Field of Classification Search
CPC ............... B60H 1/004; B60H 1/00899; B60H 2001/00928; F25D 21/002; F25D 21/006; F25D 21/06; F25B 13/00
See application file for complete search history.

(56) References Cited

U.S. PATENT DOCUMENTS 5,664,429 A * 9/1997 Isaji .................. B60H 1/321
62/278
6,853,892 B2 * 2/2005 Baraszu ................. B60K 6/48
701/22
(Continued)

FOREIGN PATENT DOCUMENTS

CN    101332754 A    12/2008
CN    102059932 A    5/2011
(Continued)

OTHER PUBLICATIONS

First Office Action for Chinese Application No. 201610027754.5, dated Jul. 29, 2019, 6 pages.

*Primary Examiner* — Frantz F Jules
*Assistant Examiner* — Martha Tadesse
(74) *Attorney, Agent, or Firm* — Brooks Kushman PC; David Kelly

(57) ABSTRACT

A vapor compression heat pump (VCHP) system for an electrified vehicle and a method for de-icing the VCHP system is provided. The electrified vehicle may include a vehicle cabin, the VCHP system, and a controller. The VCHP system may be in thermal communication with the cabin and include an outside heat exchanger and a compressor. The controller may be configured to, in response to detection of a predefined ice condition associated with the outside heat exchanger, output commands to adjust a speed of the compressor to influence a temperature of refrigerant flowing through the compressor such that the refrigerant carries an amount of heat sufficient to eliminate the predefined ice condition within a preselected time period. The predefined ice condition may be a condition in which the heat exchanger has accumulated ice or is likely to accumulate ice.

8 Claims, 4 Drawing Sheets

(51) Int. Cl.
 *F25D 21/00* (2006.01)
 *F25B 47/02* (2006.01)
 *B60H 1/00* (2006.01)
 *F25B 49/02* (2006.01)

(52) U.S. Cl.
 CPC .. *F25B 49/025* (2013.01); *B60H 2001/00928* (2013.01); *B60H 2001/00961* (2019.05); *F25B 2600/025* (2013.01); *F25B 2700/2106* (2013.01)

(56) References Cited

U.S. PATENT DOCUMENTS

| | | | |
|---|---|---|---|
| 7,328,587 B2 * | 2/2008 | Shaffer | F01D 15/08 60/602 |
| 7,637,031 B2 | 12/2009 | Salim et al. | |
| 8,733,126 B2 | 5/2014 | Sekiya et al. | |
| 9,188,350 B2 | 11/2015 | Choi et al. | |
| 9,222,710 B2 | 12/2015 | Katayama et al. | |
| 2004/0045750 A1 * | 3/2004 | Baraszu | B60K 6/48 180/65.25 |
| 2006/0096308 A1 | 5/2006 | Manole | |
| 2006/0254308 A1 | 11/2006 | Yokoyama et al. | |
| 2012/0266623 A1 * | 10/2012 | Patel | F25B 41/062 62/225 |
| 2013/0081419 A1 | 4/2013 | Katoh et al. | |
| 2013/0227973 A1 | 9/2013 | Kang et al. | |
| 2014/0190189 A1 | 7/2014 | Kowsky et al. | |
| 2015/0040589 A1 * | 2/2015 | Quetant | B60H 1/00921 62/81 |

FOREIGN PATENT DOCUMENTS

| | | | |
|---|---|---|---|
| CN | 102889653 A | 1/2013 | |
| CN | 102958724 A | 3/2013 | |
| FR | 2963278 A1 * | 2/2012 | ............ B60H 1/321 |
| FR | 2963278 A1 | 2/2012 | |
| WO | 2013131589 A1 | 9/2013 | |
| WO | WO 2013131589 A1 * | 9/2013 | ......... B60H 1/00921 |
| WO | WO-2013131589 A1 * | 9/2013 | ......... B60H 1/00921 |

\* cited by examiner

DE-ICING CONTROL IN A VAPOR COMPRESSION HEAT PUMP SYSTEM

TECHNICAL FIELD

The present disclosure relates to vapor compression heat pump technology and a de-icing mode for a vapor compression heat pump system.

BACKGROUND

Electrified vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. Vehicle cabin climate control systems may operate with engine thermal management systems to provide efficient distribution of heat via refrigerants and coolant flowing throughout a heat pump system. A control system may direct operation of various components of the climate control systems and thermal management systems based on input received from sensors monitoring vehicle and ambient conditions.

SUMMARY

A method for de-icing a vapor compression heat pump system for a vehicle includes, in response to detection of a predefined ice condition of a heat exchanger, outputting by a controller a command to adjust output of a compressor from a first speed to a second speed sufficient to generate an amount of heat in a refrigerant flowing through the heat exchanger to reduce the ice condition. The ice condition may be a condition in which the heat exchanger has accumulated ice or is likely to accumulate ice. The detection may be based on ambient conditions and an operating mode of the heat exchanger. The controller may execute a bumpless transfer algorithm to mediate adjustment between the first and second speeds to comply with predefined noise, vibration, and harshness standards. The adjustment may adjust the speed of the compressor to a preselected constant speed. The controller may, in response to an absence of detection of the predefined ice condition for a predetermined time period, output a command to further adjust the output of the compressor such that a speed of the compressor decreases. The controller may, in response to presence of a predefined amount of heat in the refrigerant and a predefined speed of the compressor, output a control signal to activate a climate control system to modify climate conditions of a cabin of the vehicle to a predetermined state. The controller may execute an algorithm to control outputs of actuators of the climate control system to modify the climate conditions to the predetermined state.

An electrified vehicle includes a vehicle cabin, a vapor compression heat pump system, and a controller. The compression heat pump system is in thermal communication with the cabin and includes an outside heat exchanger and a compressor. The controller is configured to, in response to detection of a predefined ice condition associated with the outside heat exchanger, output commands to adjust a speed of the compressor to influence a temperature of refrigerant flowing through the compressor such that the refrigerant carries an amount of heat sufficient to eliminate the predefined ice condition within a preselected time period. The speed of the compressor may be adjusted such that climate conditions of the vehicle cabin are within a predetermined range. The predefined ice condition may be a condition in which the heat exchanger has accumulated ice or is likely to accumulate ice. The speed of the compressor may be adjusted such that the refrigerant achieves a temperature sufficient to at least partially melt the accumulated ice. The controller may be further configured to execute a bumpless transfer algorithm to mediate adjustment of the speed to prevent an occurrence of a speed bump. The controller may be further configured to execute a bumpless transfer algorithm to mediate adjustment of the speed to comply with predefined noise, vibration, and harshness standards.

A vapor compression heat pump system for an electrified vehicle includes a heat exchanger, one or more sensors, a compressor, a distribution circuit, and a controller. The one or more sensors monitor conditions of the heat exchanger and preselected ambient conditions. The distribution circuit distributes refrigerant through the system. The controller is configured to, in response to input from the sensors indicating detection of an ice condition of the heat exchanger, initiate a de-icing mode that implements a speed command transition map to adjust a speed of the compressor such that refrigerant flowing therethrough achieves a temperature sufficient to melt ice. The controller may be further configured to execute a bumpless transfer algorithm in the de-icing mode to mediate adjustment of the speed to comply with predefined noise, vibration, and harshness standards. The ice condition may be a condition in which the heat exchanger has accumulated ice or is likely to accumulate ice. Adjusting the speed includes increasing the speed. The controller may be further configured to reduce the speed upon expiration of a predefined time interval.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
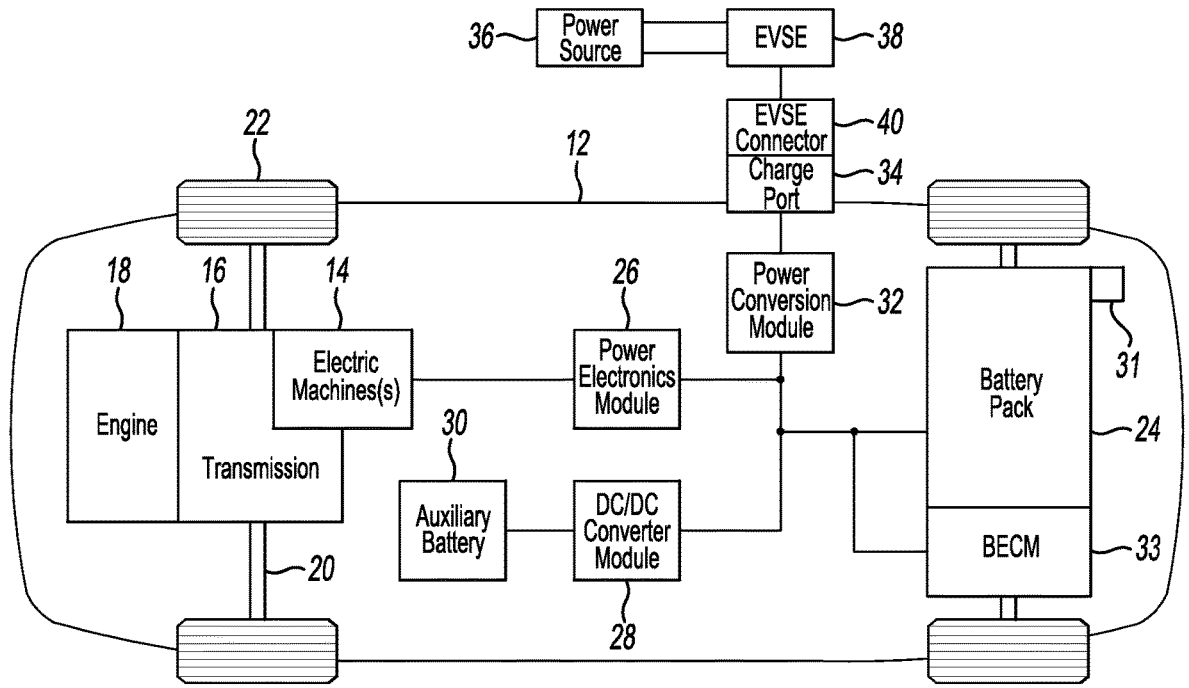
FIG. 1 is a schematic illustrating an example of an electrified vehicle.

FIG. 1 depicts a schematic of an example of a plug-in hybrid-electric vehicle (PHEV). A plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electrified vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Figure 2:
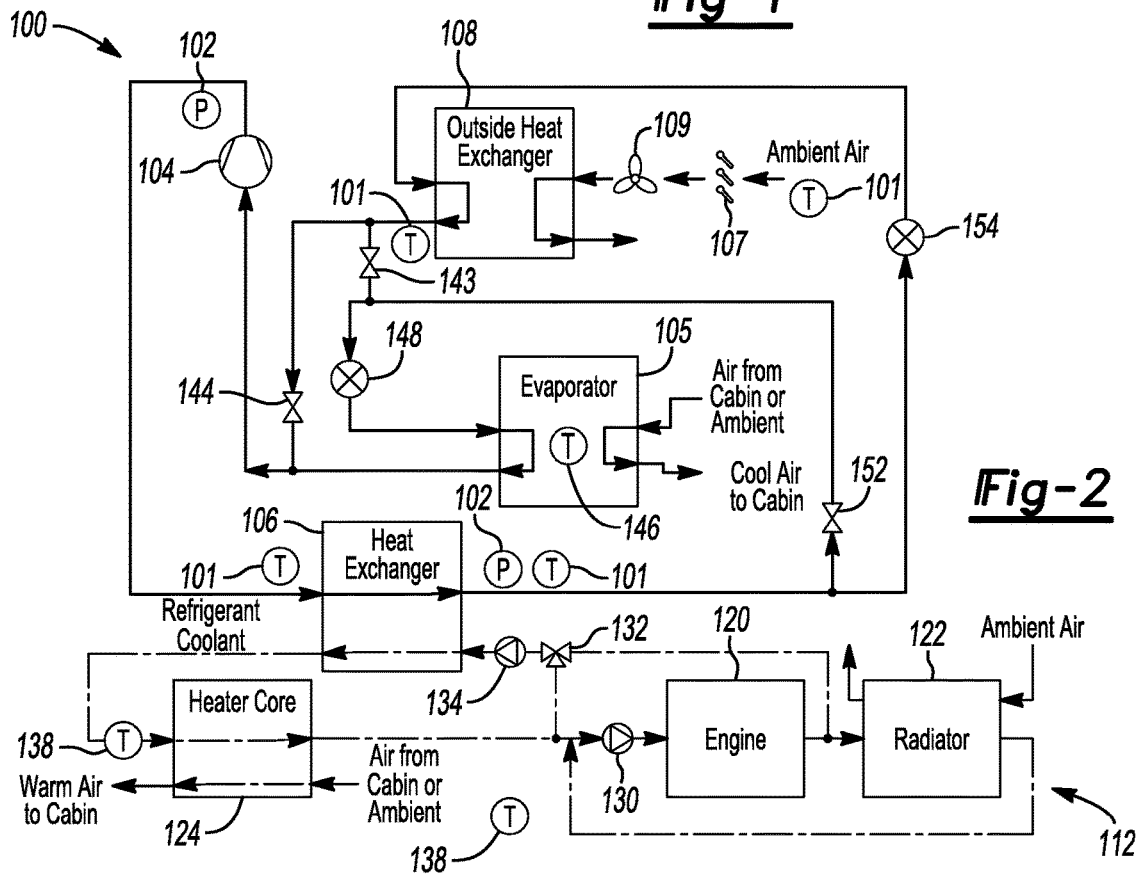
FIG. 2 is a schematic illustrating an example of a system structure for a vapor compression heat pump (VCHP) system.

Under certain conditions, electrified vehicles, such as PHEV and BEV vehicles, may need an alternative source of heat to replace or augment an amount of heat rejected by a traditional internal combustion engine to meet vehicle cabin heating targets. Vehicle compression heat pump technology may provide acceptable vehicle cabin heating outputs by controlling an amount of energy use at mild ambient conditions. FIG. 2 shows an example of a vapor compression heat pump (VCHP) system, generally referenced to as VCHP system 100 herein. A plurality of temperature sensors 101 and pressure sensors 102 may be disposed throughout the VCHP system to assist in monitoring conditions thereof. The VCHP system 100 may include a compressor 104 which may provide refrigerant compression for both heating and cooling modes in combination with various valve configurations in thermal loops. A heat exchanger, such as an evaporator 105, may include paths for refrigerant and cabin air to flow therethrough. Warm air from a cabin of the vehicle may pass through the evaporator 105 with the assistance of a blower (not shown) or other suitable component such that the refrigerant may absorb heat from the warm air en route to the compressor 104. A heat exchanger 106 may facilitate a counter-flow of the refrigerant and a coolant flowing within an engine coolant circuit 112.

For example, the engine coolant circuit 112 may include an engine 120, a radiator 122, and a coolant heater core 124. A coolant pump 130, a heater core isolation valve (HCIV) 132, and an auxiliary coolant pump 134 may facilitate distribution of the coolant within the engine coolant circuit 112. Sensors, such as temperature sensors 138, may measure conditions of the engine coolant circuit 112 to assist in facilitating distribution of the coolant. The heat exchanger 106 may operate to facilitate heat transfer between the coolant and refrigerant.

Figure 3:
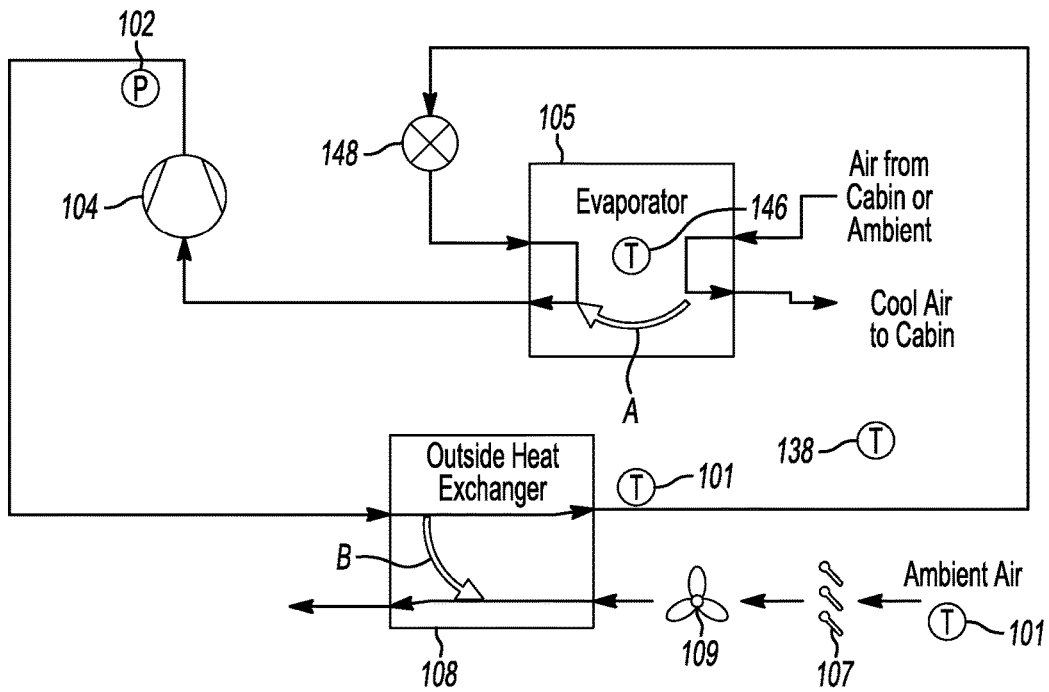
FIG. 3 is a schematic illustrating an example of a cooling mode of the VCHP system of FIG. 2.

An outside heat exchanger 108 operates with the compressor 104 and the evaporator 105 and may act as a conduit to release heat removed from the vehicle cabin when the VCHP system 100 is in the cooling mode. For example and as shown in FIG. 3, ambient air may enter the outside heat exchanger 108 with the assistance of a blower 109. One or more grill shutters 107 may be selectively opened and closed to control airflow into the outside heat exchanger 108. Refrigerant flowing from the compressor 104 passes through the outside heat exchanger 108 in a cross flow pattern relative to the ambient air flowing therethrough and such that heat is transferred from the refrigerant (represented by Q arrow B). In the cooling mode, a first check valve 143 (not shown in FIG. 3) is open and a first bypass valve 144 is closed (not shown in FIG. 3) such that the refrigerant flows through a first expansion valve 148 en route to the evaporator 105. Air from the vehicle cabin enters the evaporator 105 and an evaporator temperature sensor 146 may monitor temperature conditions of the evaporator 105 to assist in directing operation of the first expansion valve 148. The evaporator 105 facilitates heat transfer from the air to the refrigerant (represented by Q arrow A) such that the refrigerant is converted to a gaseous state en route to the compressor 104 and the now cooler air is released from the evaporator 105 into the vehicle cabin. A second bypass valve 152 and a second expansion valve 154 may further assist in directing refrigerant flow throughout the VCHP system 100. For example, the second bypass valve 152 may selectively open and close such that refrigerant may flow to the evaporator 105 or the outside heat exchanger 108. In the cooling mode, the first expansion valve 148 may be throttled while second expansion valve 154 is wide open.

Figure 4:
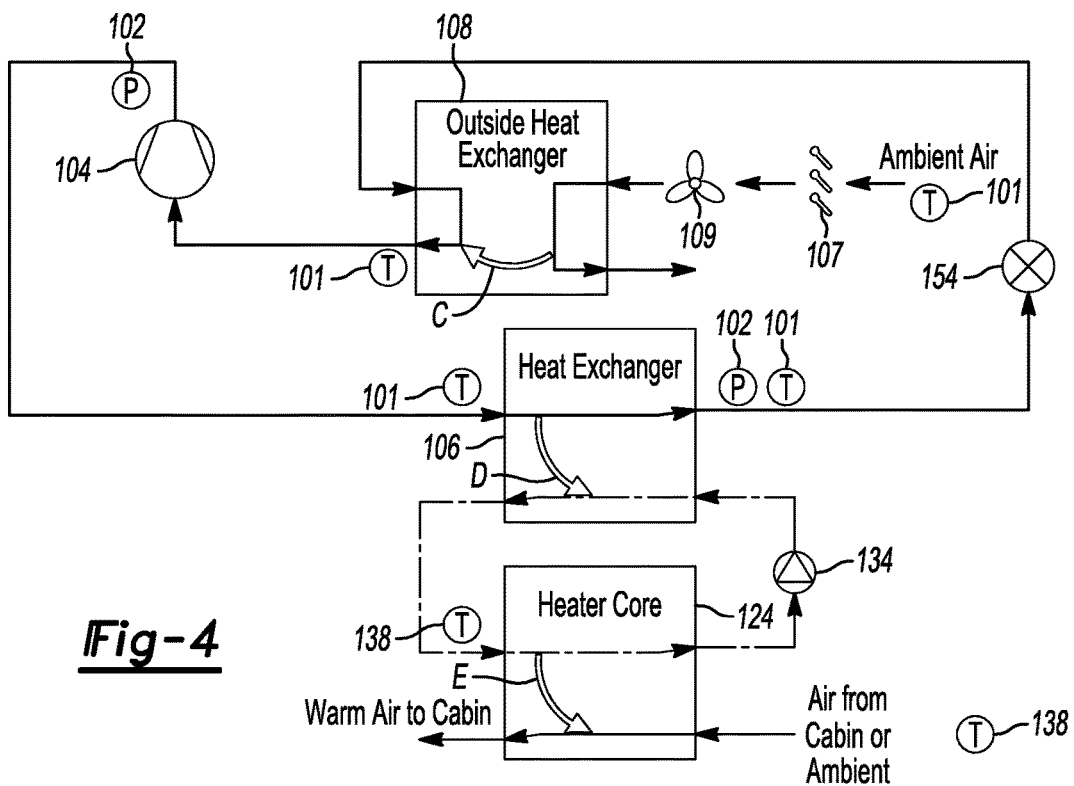
FIG. 4 is a schematic illustrating an example of a heating mode of the VCHP system of FIG. 2.

FIG. 4 shows an operational example of the heating mode of the VCHP system 100. Heat from the ambient air may be taken into the VCHP system 100 via the outside heat exchanger 108 (represented by Q arrow C). For example, ambient air may pass through the one or more grill shutters 107 and the outside heat exchanger 108 as influenced by the blower 109. Refrigerant flowing through the outside heat exchanger 108 may pass through the compressor 104 en route to the heat exchanger 106. Heat from the refrigerant may be transferred to the coolant of the engine coolant circuit 112 via the heat exchanger 106 (represented by Q arrow D). The now warmer coolant may travel through the coolant heater core 124 and be released into the vehicle cabin (represented by Q arrow E). In some heating modes, such as the heating mode shown in FIG. 4, the auxiliary coolant pump 134 operates to move the coolant and the HCIV 132 is partially closed to define an isolated loop which may exclude coolant from then engine 120 and the radiator 122 from entering the heat exchanger 106.

The VCHP system 100 may have additional operating modes as well. During operation and depending on temperature and humidity conditions, the outside heat exchanger 108 may be subject to ice accumulation. The ice accumulation, if not properly accommodated or removed, may adversely affect efficiency of the VCHP system 100 or potentially cause physical damage to components thereof. A de-icing mode of the VCHP system 100 may assist in removing this ice accumulation by adjusting an operating speed of the compressor 104 to manage thermal conditions of the refrigerant flowing through the VCHP system 100. For example, the de-icing mode may initiate one or more commands to direct operation of the compressor 104, the valves, and one or more actuators to facilitate melting of the ice accumulation. The de-icing mode may safely remove the ice accumulation to improve operating efficiency of the VCHP system 100 while minimizing speed changes of the compressor 104 during mode switches to also manage noise, vibration, and harshness (NVH) performance.

Figure 5:
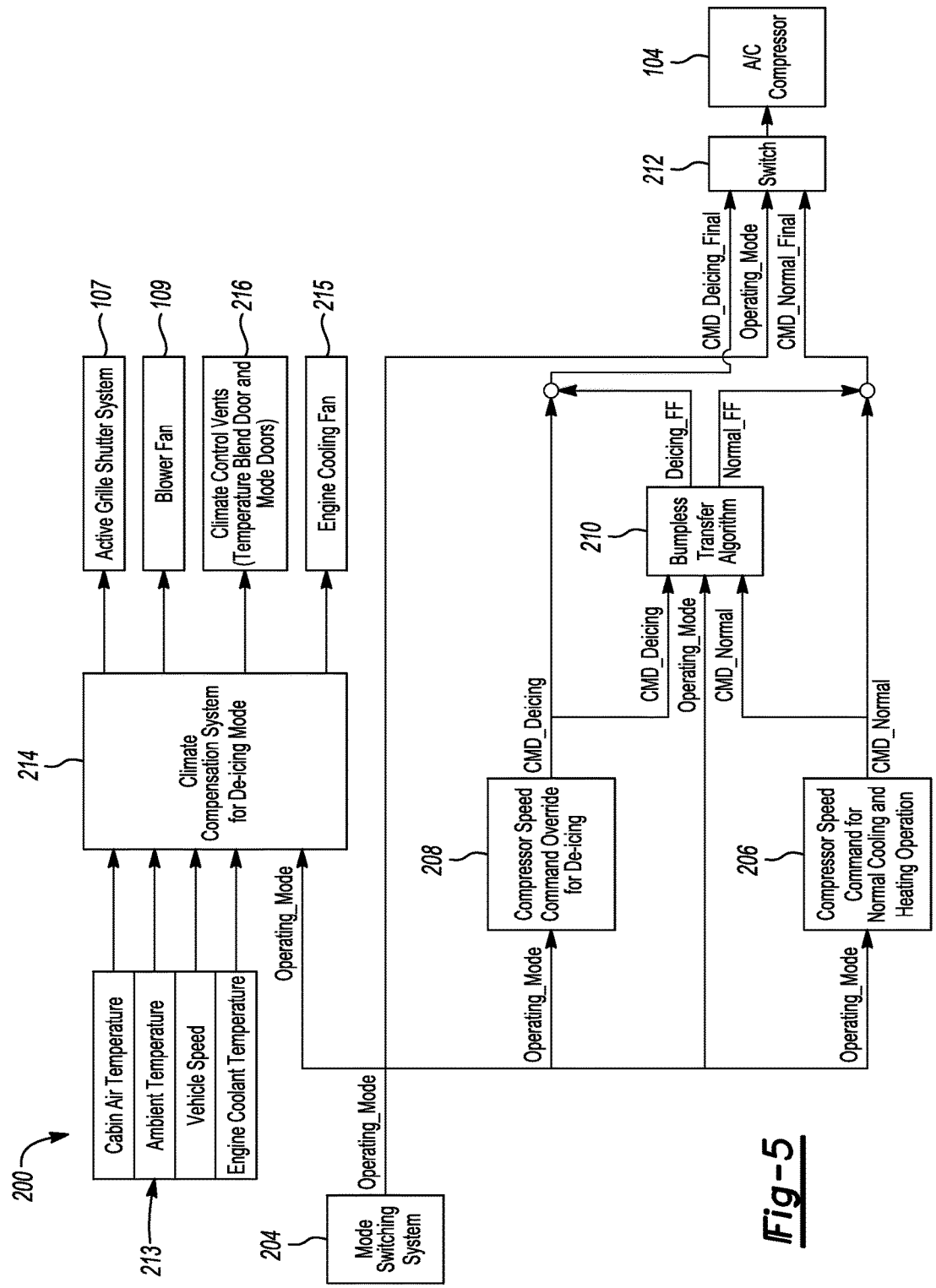
FIG. 5 is a block diagram illustrating an example of a control subsystem architecture for the VCHP system of FIG. 2.

FIG. 5 shows an example of a control subsystem architecture for the VCHP system 100, generally referred to as architecture 200 herein. Examples of control subsystems which may support the VCHP system 100 include a mode switching system 204, a compressor speed command for normal cooling and heating operation 206, a compressor speed command override for de-icing 208, a bumpless transfer algorithm 210, a switch system 212, and a climate compensation system for de-icing mode 214. The control subsystems cooperate with one another to implement the de-icing mode. For example, a controller (not shown) may adjust a speed of the compressor 104, such as increasing the speed relative to operating speed of other modes, when the VCHP system 100 is in the de-icing mode. The controller may adjust the speed of the compressor 104 subject to a refrigerant pressure limit and an upper speed limit of the compressor 104. The increased speed of the compressor 104 may assist in generating an amount of heat in the refrigerant flowing through the VCHP system 100 that is higher than a normal heating operation and thus remove the ice accumulation on the outside heat exchanger 108 as further described herein. Operation of other components of the VCHP system 100 may also be adjusted to assist in removing the ice accumulation. For example, the expansion valves may be opened to avoid increasing a cooling trend of the refrigerant. In another example, the compressor 104 speed may be a function of various inputs such as ambient temperature and predefined conditions included in a calibration table accessible by the controller.

The mode switching system 204 may output signals to indicate a current operating mode for the VCHP system 100 based on predetermined and measurable conditions. For example, the conditions may include various temperatures, climate requests such as a user input to a climate control interface, and ice accumulation. Examples of operating modes relative to the output signals include the heating mode, the cooling mode, and the de-icing mode. If the VCHP system 100 is in the heating or cooling mode, the compressor speed command system for normal cooling and heating operation 206 may assume operating control of speed command generation for the compressor 104. The command generation may be based on the detection of one or more predefined conditions, such as predefined ice conditions, and utilize a closed-loop structure such that the speed of the compressor 104 operates to bring the temperature of the evaporator 105 (in cooling mode) or the temperature of the coolant heater core 124 (in heating mode) to a predetermined level.

Examples of the predefined ice conditions may include a condition in which ice has accumulated on the outside heat exchanger 108 and a condition in which a combination of measurable variables indicates an accumulation of ice on the outside heat exchanger 108 is likely to occur. Another predefined ice condition may be a condition in which a time-based interval has expired relating to receiving or not receiving signals indicating ice accumulation or a likelihood that ice accumulation will occur. For example, the mode switching system 204 may direct a transition out of the de-icing mode regardless of signals received the de-icing mode is operating for a predetermined time limit which may be based on performance attributes of the climate control system indicating the climate conditions of the vehicle cabin are not within a predetermined comfort range for passengers. If one of the predefined ice conditions on the outside heat exchanger 108 is detected, the mode switching system 204 may output a control signal to the compressor speed command override for de-icing 208 to switch the VCHP system 100 to the de-icing mode and to assume control of the speed command generation for the compressor 104. Under certain conditions, the VCHP system 100 may not immediately switch to the de-icing mode upon detection of one of the predefined ice conditions. For example, the VCHP system 100 may delay a transition to de-icing mode to prepare other components within the VCHP system 100 for the de-icing mode or to avoid undesirable transition behaviors of the components that may be noticeable by the driver or passengers.

Compressor 104 speed commands are generally different for the de-icing mode relative to the cooling and heating modes. Transitioning between compressor 104 speed commands may sometimes result in a speed bump occurrence. The speed bump occurrence may be described as a compressor speed transition which may compromise durability and NVH conditions of the compressor 104. Monitoring operation of the compressor 104 during transitions between modes may provide information to assist in preventing or minimizing occurrences of speed bumps. The controller may utilize an algorithm to assist in directing operations of the VCHP system 100.

For example, the bumpless transfer algorithm 210 may include a de-icing feed forward signal and a normal feed forward signal. Each of the feed forward signals may include an initial value of a command difference at a time instant of a transition between operating modes. The feed forward signals may also reduce to zero exponentially and relative to a calibratable time constant. The feed forward signals may maintain current compressor 104 speed commands when initially transitioning to another operating mode and then may fade out. Integrator gains in the normal operating modes may also be reset when the VCHP system 100 transitions to the de-icing mode. The integrator gains may then be brought to predetermined calibration values exponentially to assist in providing speed commands which promote a smooth compressor 104 speed transition. For example, a calibratable timer threshold may be defined as a maximum time period in which the de-icing mode may operate without damaging the VCHP system 100 or negatively affecting passenger comfort. Once the timer threshold is met, the VCHP system 100 may exit the de-icing mode despite a presence of one of the predefined ice conditions on the outside heat exchanger 108.

The switch system 212 may operate to select a compressor 104 speed command based on one or more conditions such as the operating mode of the VCHP system 100 for deliverance to the compressor 104 and/or other inputs such as conditions measured by the pressure and temperature sensors. Since vehicle cabin temperature may be influenced due to excess heat in the engine coolant circuit, the climate compensation system for de-icing mode 214 operates to manage climate conditions of the vehicle cabin when the VCHP system 100 is in the de-icing mode. For example, the climate compensation system for de-icing mode 214 may be configured to adjust operation of actuators, such as the grill shutters 107, the blower fan 109, an engine coolant fan 215, and climate control vents 216, to assist in maintaining a temperature of the vehicle cabin. Operational commands for the actuators may be based on accessible look-up tables which include inputs such as vehicle cabin temperature, ambient temperature, vehicle speed, and engine coolant temperature to name a few and referred to generally as inputs 213.

Figure 6:
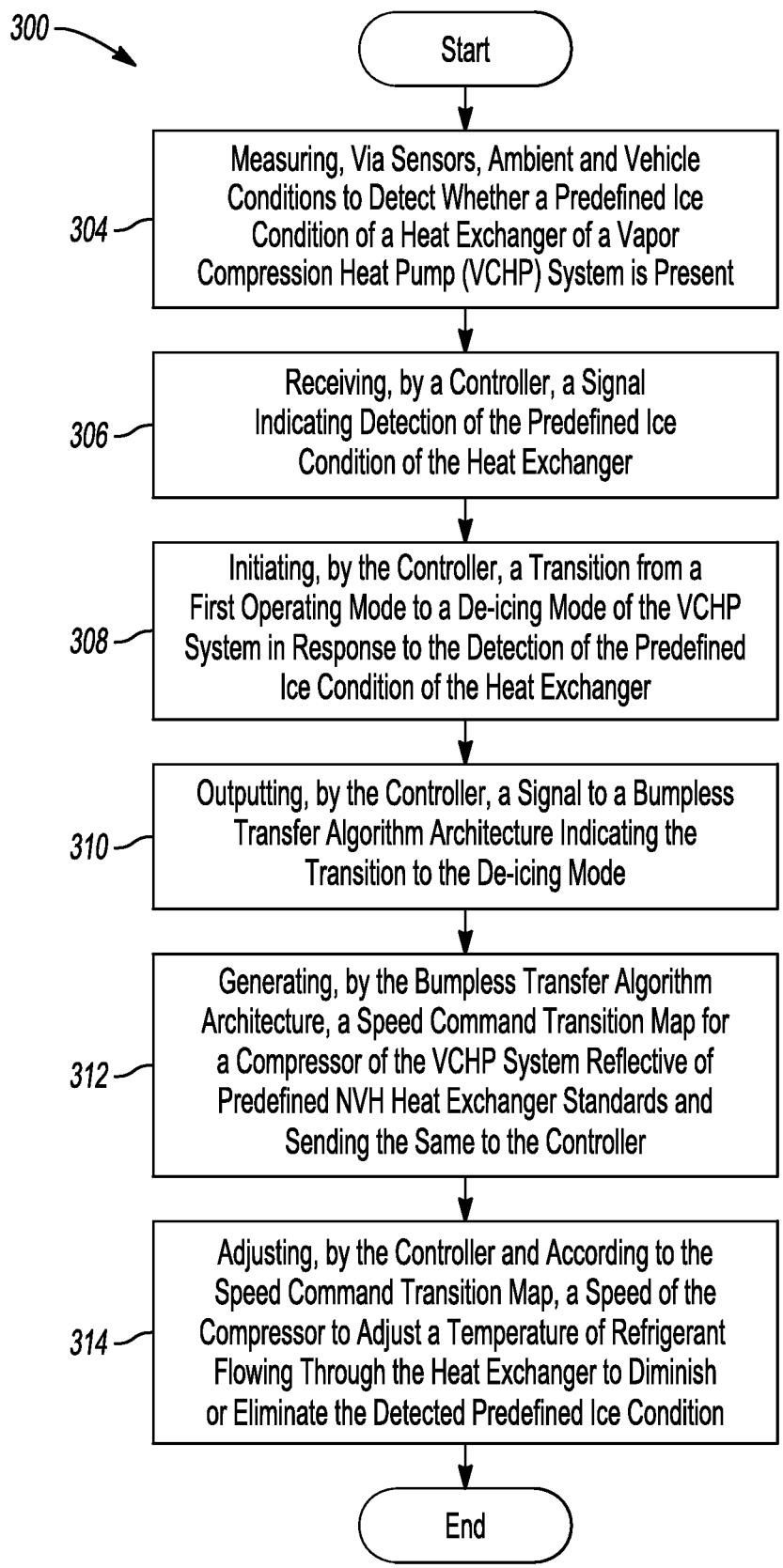
FIG. 6 is a flow chart illustrating an example of an algorithm for operation of the control subsystem architecture of FIG. 5.

FIG. 6 shows an example of an algorithm for a de-icing control in a vapor compression heat pump system. The algorithm is generally indicated by reference numeral 300 and may be utilized with the VCHP system 100. In operation 304, one or more sensors may measure conditions of and proximate to the vapor compression heat pump system. The one or more sensors may send a signal including information relating to the measured conditions to a controller in operation 306. For example, the measured conditions may include ambient conditions, and temperature and pressure conditions of the components of the vapor compression heat pump system. The controller may evaluate whether the measured conditions satisfy one of the predefined ice conditions. In response to receiving a signal which indicates a presence of one of the predefined ice conditions, the controller may initiate a transition from a first operating mode, such as the cooling and heating modes described above, to a de-icing mode of the vapor compression heat pump system in operation 308. In operation 310, the controller may output a control signal to a bumpless transfer algorithm architecture indicating the transition to the de-icing mode.

As described above, the bumpless transfer algorithm architecture may operate to assist in facilitating a smooth speed transition of a compressor of the vapor compression heat pump system. The bumpless transfer algorithm architecture may generate a speed command transition map for the compressor which is reflective of predefined NVH standards in operation 312. For example, the speed command transition map may include one or more commands which adjust the speed of the compressor under an open loop approach from a current operating speed to a de-icing speed. The de-icing speed may be a compressor speed which influences a temperature of the refrigerant flowing therethrough such that the temperature of the refrigerant increases to prevent, diminish, or remove ice accumulation on the outside heat exchanger. In operation 314, the controller may adjust a speed of the compressor to the de-icing speed based on the speed command transition map and such the predefined ice condition is prevented, diminished, or removed.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. An electrified vehicle comprising: a vapor compression heat pump system including an outside heat exchanger and a compressor; and a controller programmed to, responsive to exchanger ice condition detection, output a speed command transition map from a bumpless transfer algorithm architecture to increase compressor speed in compliance with predefined noise, vibration, and harshness standards to eliminate the exchanger ice condition via increased coolant temperature.

2. The electrified vehicle of claim 1, wherein the vapor compression heat pump system is in thermal communication with a vehicle cabin, and wherein the compressor speed is adjusted such that climate conditions of the vehicle cabin are maintained within a predetermined range.

3. The electrified vehicle of claim 1, wherein the exchanger ice condition is a condition in which the outside heat exchanger has accumulated ice or the controller detects conditions indicating the ice will accumulate.

4. The electrified vehicle of claim 1, wherein the bumpless transfer algorithm architecture generates the speed command transition map to prevent an occurrence of a speed bump in a speed transition of the compressor.

5. A vapor compression heat pump system for an electrified vehicle comprising: a heat exchanger; one or more sensors to monitor conditions of the heat exchanger and preselected ambient conditions: a compressor; a distribution circuit to distribute refrigerant through the vapor compression heat pump system; and a controller programmed to, responsive to input from the one or more sensors indicating detection of an ice condition of the heat exchanger, initiate a de-icing mode that implements a speed command transition map obtained from a bumpless transfer algorithm architecture comparing a de-icing feed forward signal and a normal feed forward signal to adjust a compressor speed such that the refrigerant flowing therethrough achieves a temperature sufficient to melt ice and such that adjustment of the compressor speed is in compliance with predefined noise, vibration, and hardness standards.

6. The vapor compression heat pump system of claim 5, wherein the ice condition is a condition in which the heat exchanger has accumulated the ice or the controller detects conditions indicating the ice will accumulate.

7. The vapor compression heat pump system of claim 5, wherein adjusting the compressor speed includes increasing the compressor speed.

8. The vapor compression heat pump system of claim 7, wherein the controller is further configured to reduce the compressor speed upon expiration of a predefined time interval.

* * * * *